(12) United States Patent
Fan et al.

(10) Patent No.: US 9,122,411 B2
(45) Date of Patent: Sep. 1, 2015

(54) SIGNAL ORDER-PRESERVING METHOD AND APPARATUS

(71) Applicant: Huawei Technologies Co., Ltd., Shenzhen (CN)

(72) Inventors: Chunlei Fan, Chengdu (CN); Zhuo Chen, Chengdu (CN); Renjie Qu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 14/143,101

(22) Filed: Dec. 30, 2013

(65) Prior Publication Data

US 2014/0115201 A1    Apr. 24, 2014

Related U.S. Application Data

(63) Continuation of application No. PCT/CN2011/079681, filed on Sep. 15, 2011.

(51) Int. Cl.
*G06F 5/06* (2006.01)

(52) U.S. Cl.
CPC . *G06F 5/065* (2013.01); *G06F 5/06* (2013.01)

(58) Field of Classification Search
CPC .................................. G06F 5/06; G06F 5/065
See application file for complete search history.

(56) References Cited

U.S. PATENT DOCUMENTS

| | | | |
|---|---|---|---|
| 6,144,604 A | 11/2000 | Haller et al. | |
| 6,246,684 B1 * | 6/2001 | Chapman et al. | 370/394 |
| 6,581,111 B1 * | 6/2003 | Lakhanpal et al. | 710/5 |
| 7,184,446 B2 * | 2/2007 | Rashid et al. | 370/424 |

(Continued)

FOREIGN PATENT DOCUMENTS

| | | |
|---|---|---|
| CN | 1423818 A | 6/2003 |
| CN | 101291208 A | 10/2008 |
| CN | 102117193 A | 7/2011 |

OTHER PUBLICATIONS

Foreign Communication From A Counterpart Application, Chinese Application No. 201180001916.3, Chinese Office Action dated Oct. 9, 2012, 21 pages.
Foreign Communication From A Counterpart Application, PCT Application No. PCT/CN2011/079681, English Translation of International Search Report dated Jun. 28, 2012, 3 pages.

(Continued)

*Primary Examiner* — Eric Oberly
(74) *Attorney, Agent, or Firm* — Conley Rose, P.C.; Grant Rodolph; Nicholas K. Beaulieu

(57) ABSTRACT

Embodiments of the present invention relate to a signal order-preserving method and apparatus. When data of a request signal that comes from a corresponding first upstream device is written into a first first input first output (FIFO) memory, invalid data is written into a second FIFO memory corresponding to a second upstream device in a same clock cycle; and the data of the request signal is read from the first FIFO memory, the invalid data is read from the second FIFO memory, the invalid data is discarded, and the data of the request signal is conveyed to a downstream device. Through the signal order-preserving method and apparatus in the embodiments of the present invention, the coupling extent between devices on which there is an order-preserving requirement is reduced while signal order-preserving is achieved.

8 Claims, 5 Drawing Sheets

(56) References Cited

U.S. PATENT DOCUMENTS

| | | |
|---|---|---|
| 8,243,751 B2 | 8/2012 | Visa et al. |
| 2003/0107937 A1* | 6/2003 | Williams et al. ............ 365/221 |
| 2005/0138281 A1 | 6/2005 | Garney et al. |
| 2007/0260614 A1 | 11/2007 | Bray |
| 2011/0196999 A1 | 8/2011 | Greene |

OTHER PUBLICATIONS

Foreign Communication From A Counterpart Application, PCT Application No. PCT/CN2011/079681, English Translation of Written Opinion dated Jun. 28, 2012, 8 pages.

* cited by examiner

SIGNAL ORDER-PRESERVING METHOD AND APPARATUS

CROSS-REFERENCE TO RELATED APPLICATION

This application is a continuation of International Application No. PCT/CN2011/079681, filed on Sep. 15, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to communication technologies, and in particular, to a signal order-preserving method and apparatus.

BACKGROUND

In communication and network chips, for a communication process in which there are multiple groups of signals between multiple modules of different clock domains, to ensure correctness of data reading and writing, it is required to ensure that a precedence relationship between read and write requests keeps consistent with the time order. Therefore, order-preserving processing is required.

For example, in a complicated application scenario, in a first clock cycle, a device A requests a read operation on an address 0; in a second clock cycle, a device B requests a write operation on the address 0; in a third clock cycle, a device C requests the read operation on the address 0; in a fourth clock cycle, a device D requests the read operation on the address 0; in a fifth clock cycle, a device E requests the write operation on the address 0; in the sixth clock cycle, a device F requests the read operation on the address 0, and so on. To ensure correctness of data reading and writing, the controller needs to perform the read and write operations on the memory according to the foregoing order exactly. Otherwise, disorder will occur, which results in system errors.

Currently, in an existing signal order-preserving method, a manner of write confirmation is generally adopted for order-preserving. For an address, the controller is not allowed to perform the read operation on the address until a write confirmation signal of the address is returned. Through such a signal order-preserving method, delay caused by the write confirmation deepens buffering of a subsequent request source, and thereby intensifies the coupling extent between modules or devices on which there is an order-preserving requirement. Moreover, the delay caused by the write confirmation makes subsequent requests intermittent. Consequently, the system performance is not steady, so it is difficult to meet demands for high quality.

SUMMARY

An embodiment of the present invention provides a signal order-preserving method, for overcoming defects in the prior art, and reducing the coupling extent between devices on which there is an order-preserving requirement, while achieving signal order-preserving.

An embodiment of the present invention further provides a signal order-preserving apparatus, for overcoming defects in the prior art, and reducing the coupling extent between devices on which there is an order-preserving requirement, while achieving signal order-preserving.

An embodiment of the present invention further provides a signal order-preserving method, for overcoming defects in the prior art, and reducing the coupling extent between devices on which there is an order-preserving requirement, while achieving signal order-preserving.

An embodiment of the present invention further provides a signal order-preserving apparatus, for overcoming defects in the prior art, and reducing the coupling extent between devices on which there is an order-preserving requirement, while achieving signal order-preserving.

An embodiment of the present invention provides a signal order-preserving method, including: when writing, into at least one first first input first output (FIFO) memory, data of a request signal that comes from at least one corresponding first upstream device, writing invalid data into at least one second FIFO memory corresponding to at least one second upstream device in a same clock cycle as that of writing the data of the request signal; and reading the data of the request signal from the at least one first FIFO memory, reading the invalid data from the at least one second FIFO memory, discarding the invalid data, and conveying the data of the request signal to a downstream device.

An embodiment of the present invention further provides a signal order-preserving method, including: when receiving data of a request signal that comes from at least one upstream device, affixing a flag for indicating a current clock cycle to the data of the request signal, and writing, into a FIFO memory corresponding to each upstream device, the request signal data that carries the flag; and reading, from the FIFO memory, the request signal data that carries the flag for indicating the current clock cycle, and conveying the data to a downstream device.

An embodiment of the present invention further provides a signal order-preserving apparatus, including: a control module configured to exercise control of writing, into at least one first FIFO memory, data of a request signal that comes from at least one corresponding first upstream device, and exercise control of writing invalid data into at least one second FIFO memory in a same clock cycle as that of writing the data of the request signal; the at least one first FIFO memory, where each first FIFO memory corresponds to a first upstream device and is configured to store, under control of the control module, the data of the request signal of the corresponding first upstream device; the at least one second FIFO memory, where each second FIFO memory corresponds to a second upstream device and is configured to store invalid data under control of the control module, and there is an order-preserving requirement on the second upstream device and the at least one first upstream device; and a scheduling module configured to read the data of the request signal from the at least one first FIFO memory, read the invalid data from the at least one second FIFO memory, discard the invalid data, and convey the data of the request signal to a downstream device.

An embodiment of the present invention further provides a signal order-preserving apparatus, including: a flagging module configured to: when receiving data of a request signal that comes from at least one upstream device, affix a flag for indicating a current clock cycle to the data of the request signal, and exercise control of writing, into at least one FIFO memory, the corresponding request signal data that carries the flag; the at least one FIFO memory, where each FIFO memory corresponds to an upstream device, and is configured to store the data of the request signal of the corresponding upstream device, where the data of the request signal carries the flag for indicating the current clock cycle; and a scheduling module configured to read, from the FIFO memory, the request signal data that carries the flag for indicating the current clock cycle, and convey the data to a downstream device.

It can be known from the foregoing technical solution that, in the embodiments of the present invention, order-preserving is achieved by filling invalid data into a FIFO memory that receives no request signal, or by flagging a received request signal. Thereby, a request signal sent by each upstream device does not need to be received according to a processing state of a request signal sent by another upstream device, and therefore the coupling extent between devices on which there is an order-preserving requirement is reduced while the signal order-preserving is achieved.

BRIEF DESCRIPTION OF THE DRAWINGS

To illustrate the technical solution of the present invention or the prior art more clearly, accompanying drawings to be used in the description of the embodiments of the present invention or the prior art are introduced briefly in the following. The accompanying drawings in the following description are only some embodiments of the present invention, and persons of ordinary skill in the art can derive other drawings from these accompanying drawings without making creative efforts.

DETAILED DESCRIPTION

Technical solutions in embodiments of the present invention are described clearly in the following in conjunction with the accompanying drawings in the embodiments of the present invention. Evidently, the embodiments to be described are only part rather than all of the embodiments of the present invention. All other embodiments, which can be derived by those skilled in the art based on the embodiments of the present invention without making creative efforts, shall fall within the protection scope of the present invention.

In the following first embodiment to fifth embodiment of the present invention, before a read request signal or write request signal is sent to an ordinary memory, multiple FIFO memories are used to perform order-preserving processing on multiple read request signals or write request signals.

Figure 1:
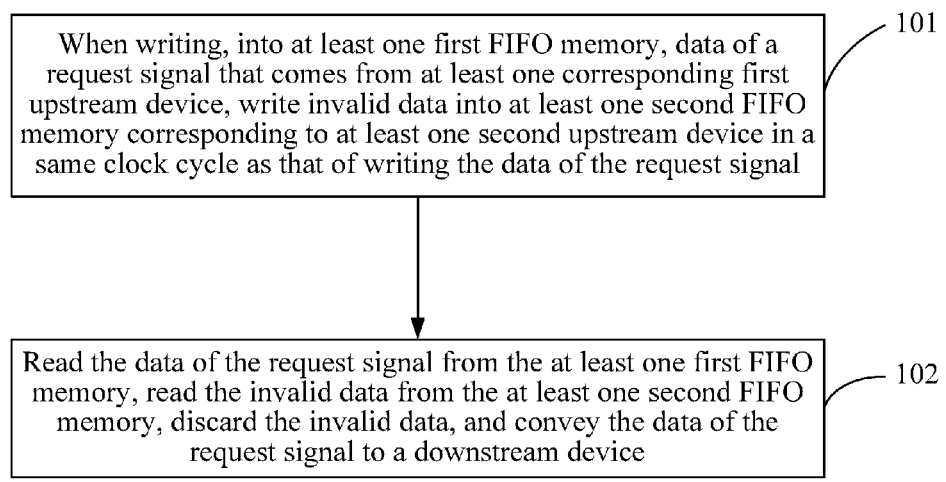
FIG. 1 is a flowchart of a signal order-preserving method according to a first embodiment of the present invention.

FIG. 1 is a flowchart of a signal order-preserving method according to a first embodiment of the present invention. As shown in FIG. 1, the method includes the following process.

Step 101: When writing, into at least one first FIFO memory, data of a request signal that comes from at least one corresponding first upstream device, write invalid data into at least one second FIFO memory corresponding to at least one second upstream device in a same clock cycle as that of writing the data of the request signal.

In this step, according to whether a request signal is sent, all upstream devices are sorted into two types: a first upstream device, and a second upstream device. The first upstream device is an upstream device that sends the request signal, and the second upstream device is an upstream device that sends no request signal, where there is an order-preserving requirement on the second upstream device and the first upstream device. Each upstream device corresponds to a FIFO memory. A FIFO memory corresponding to the first upstream device is a first FIFO memory, and a FIFO memory corresponding to the second upstream device is a second FIFO memory. In practical application, the same FIFO memory components may be used for the first FIFO memory and the second FIFO memory.

Step 102: Read the data of the request signal from the at least one first FIFO memory, read the invalid data from the at least one second FIFO memory, discard the invalid data, and convey the data of the request signal to a downstream device.

In this step, in the same clock cycle mentioned above, the data in all FIFO memories is read. Data read from the first FIFO memory is the data of the request signal, and data read from the second FIFO memory is the invalid data. The downstream device may specifically be an ordinary memory.

Through a combination of step 101 and step 102, all FIFO memories between which there is the order-preserving requirement are filled with data in a same clock cycle. The received data of the request signal is filled into the corresponding FIFO memory, the FIFO memory that receives no request signal is filled with the invalid data, and then from all FIFO memories, their respective data is read. After the data is read, all FIFO memories are empty. Subsequently, in a next clock cycle, the same method is used, the received data of the request signal is filled into the corresponding FIFO memory, the invalid data is used to be filled into the FIFO memory that receives no request signal, and then from all FIFO memories, their respective data is read. According to the order of clock cycles, this method is used sequentially in each clock cycle. Thereby, it is ensured that every request signal sent to the downstream device is the request signal in the same clock cycle, and that request signals in contiguous clock cycles are not confused with each other. Therefore, a space location of the FIFO memory that receives no request signal is occupied to ensure the time order of the request signals.

In the first embodiment of the present invention, order-preserving is performed by filling the invalid data into the FIFO memory that receives no request signal. A request signal sent by each upstream device is independent of each other, and a request signal sent by an upstream device does not need to be received according to a processing state of a request signal sent by another upstream device. Therefore, the coupling extent between the devices is reduced.

Figure 2:
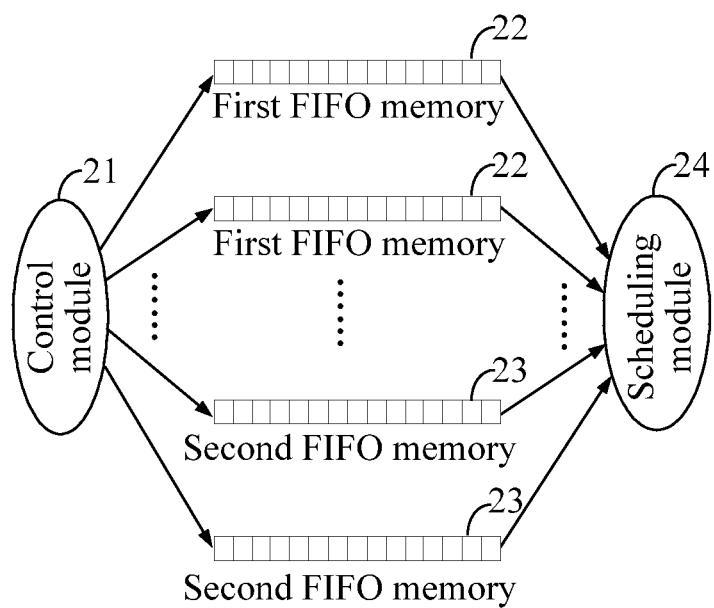
FIG. 2 is a schematic structural diagram of a signal order-preserving apparatus according to a second embodiment of the present invention.

FIG. 2 is a schematic structural diagram of a signal order-preserving apparatus according to a second embodiment of the present invention. As shown in FIG. 2, the apparatus includes: a control module 21, at least one first FIFO memory 22, at least one second FIFO memory 23, and a scheduling module 24.

The control module 21 is configured to exercise control of writing, into the at least one first FIFO memory 22, data of a request signal that comes from at least one corresponding first upstream device, and exercise control of writing invalid data into the at least one second FIFO memory 23 in a same clock cycle as that of writing the data of the request signal.

Each first FIFO memory 22 corresponds to a first upstream device, and is configured to store, under control of the control module 21, the data of the request signal of the corresponding first upstream device.

Each second FIFO memory 23 corresponds to a second upstream device and is configured to store the invalid data under control of the control module 21. The second upstream device is an upstream device, where there is an order-preserving requirement on the upstream device and the first upstream device.

The scheduling module 24 is configured to: read the data of the request signal from the at least one first FIFO memory 22, read the invalid data from the at least one second FIFO memory 23, discard the invalid data, and convey the data of the request signal to a downstream device.

The control module 21 is used to control a write operation of the FIFO memory (including the first FIFO memory 22 and the second FIFO memory 23). Therefore, all FIFO memories between which there is the order-preserving requirement are filled with data in a same clock cycle. The received data of the request signal is filled into the corresponding FIFO memory, the invalid data is used to be filled into the FIFO memory that receives no request signal, and then the scheduling module 24 reads, from all FIFO memories, their respective data. After the data is read, all FIFO memories are empty. In a next clock cycle, the control module 21 and the scheduling module 24 still perform the same functions mentioned above. The control module 21 fills the received data of the request signal into the corresponding FIFO memory, and uses the invalid data to fill the FIFO memory that receives no request signal, and then the scheduling module 24 reads, from all FIFO memories, their respective data. According to the order of clock cycles, the control module and the scheduling module execute the foregoing functions in each clock cycle. Thereby, it is ensured that every request signal sent by the scheduling module 24 to the downstream device is the request signal in the same clock cycle, and that the request signals in contiguous clock cycles are not confused with each other. Therefore, a space location of the FIFO memory that receives no request signal is occupied to ensure the time order of the request signals.

In the second embodiment of the present invention, order-preserving is performed by filling an invalid signal into the FIFO memory that receives no request signal. A request signal sent by each upstream device is independent of each other, and a request signal sent by an upstream device does not need to be received according to a processing state of a request signal sent by another upstream device. Therefore, the coupling extent between the devices is reduced.

Figure 3:
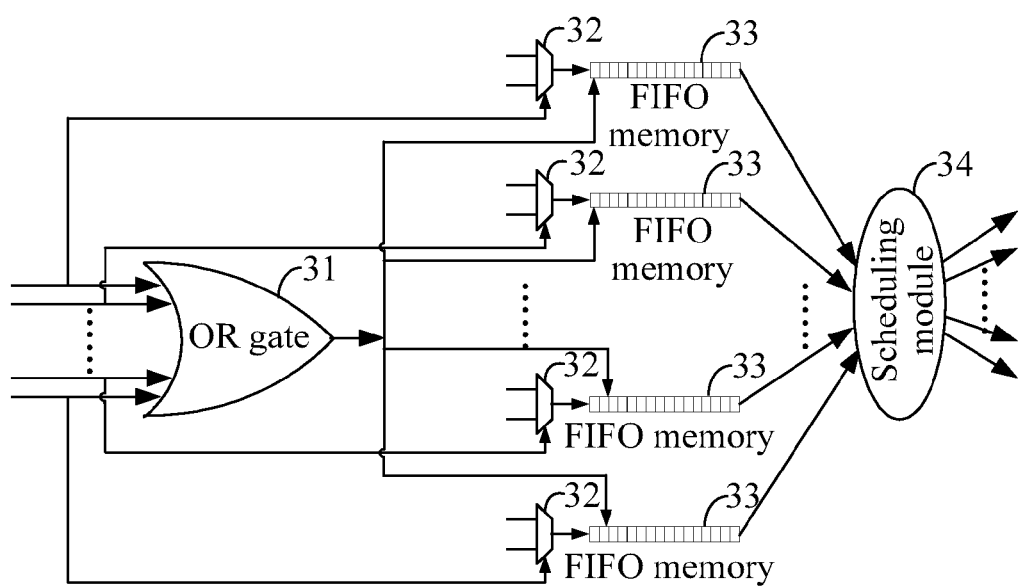
FIG. 3 is a schematic structural diagram of a signal order-preserving apparatus according to a third embodiment of the present invention.

FIG. 3 is a schematic structural diagram of a signal order-preserving apparatus according to a third embodiment of the present invention. The third embodiment of the present invention is an embodiment detailing the structure of the signal order-preserving apparatus described in the second embodiment of the present invention, and specifically, details the control module in the second embodiment of the present invention. As shown in FIG. 3, the signal order-preserving apparatus in the third embodiment of the present invention includes: an OR gate 31, at least one selector 32, at least one FIFO memory 33, and a scheduling module 34. The at least one selector 32 and the OR gate 31 in the third embodiment of the present invention form the control module 21 described in the second embodiment of the present invention.

As shown in FIG. 3, the specific structure of the signal order-preserving apparatus is as follows. Each selector 32 corresponds to one upstream device and one FIFO memory 33. Each selector 32 has two input ports, one control port, and one output port. A first input port is configured to input data of a request signal of an upstream device, and a second input port is configured to input invalid data. The control port is configured to input a valid signal or an invalid signal corresponding to the request signal sent by the upstream device. The control port of the selector 32 inputs a valid signal when the upstream device corresponding to the selector 32 outputs a request signal, or the control port of the selector 32 inputs an invalid signal when the upstream device corresponding to the selector 32 outputs no request signal. When the control port of the selector 32 inputs a valid signal, the selector 32 chooses to let the data of the first input port pass the selector 32, and the output port of the selector 32 inputs the data of the request signal of the upstream device into the corresponding FIFO memory 33; when the control port of the selector 32 inputs an invalid signal, the selector 32 chooses to let the data of the second input port pass the selector 32, and the output port of the selector 32 inputs invalid data into the corresponding FIFO memory 33. The OR gate 31 has multiple input ports and one output port. Each of the input ports corresponds to one upstream device, and is configured to input the valid signal or invalid signal corresponding to the request signal sent by the upstream device. The input port inputs a valid signal when the upstream device corresponding to the input port outputs a request signal; the input port inputs an invalid signal when the upstream device corresponding to the input port outputs no request signal. After performing an OR operation on the signal input by the input port, the OR gate 31 outputs, through the output port, a result of the OR operation as a write control signal. The output port of the OR gate 31 is connected to each FIFO memory 33 mentioned above, and outputs the write control signal to the control port of each FIFO memory 33. Each FIFO memory 33 includes an input port, an output port, and a control port. The input port of each FIFO memory 33 is connected to the output port of a corresponding selector 32, and is configured to receive the data output by the selector 32. The control port is connected to the output port of the OR gate 31, and is configured to receive the write control signal output by the OR gate 31. When the write control signal is valid, the FIFO memory 33 performs a write operation to write the data input by the input port into the FIFO memory 33; when the write control signal is invalid, the FIFO memory 33 performs no write operation. The output port of each FIFO memory 33 is connected to an input port of the scheduling module 34 separately, and outputs the data stored in the FIFO memory 33 to the scheduling module 34 as scheduled by the scheduling module 34. The scheduling module 34 processes the input data, and discards invalid data therein. The scheduling module 34 has at least one output port, and each output port outputs the data processed by the scheduling module 34 to a downstream device. A preferable implementation manner is that the downstream device is an ordinary memory.

Specifically, in all upstream devices that have the order-preserving requirement, the upstream device that sends a request signal is a first upstream device, and the upstream device that sends no request signal is a second upstream device. In all selectors 32 shown in FIG. 3, the selector 32 corresponding to the first upstream device is a first selector, and the selector 32 corresponding to the second upstream device is a second selector. In all FIFO memories 33 shown in FIG. 3, the FIFO memory 33 corresponding to the first upstream device is a first FIFO memory, and the FIFO memory 33 corresponding to the second upstream device is a second FIFO memory. Therefore, in the signal order-preserving apparatus shown in FIG. 3, the control module thereof specifically includes at least one first sector, at least one second selector, and an OR gate. Each first selector corresponds to one first FIFO memory and one first upstream device, and is configured to select the data of the request signal for the corresponding first FIFO memory, as triggered by the valid signal of the corresponding first upstream device. Each second selector corresponds to a second FIFO memory, and is configured to select invalid data for the corresponding second FIFO memory, as triggered by the invalid signal corresponding to the second upstream device. The OR gate is configured to send a write-valid control signal to at least one first FIFO memory and at least one second FIFO memory, as triggered by the valid signal corresponding to the at least one first upstream device and by the invalid signal corresponding to the at least one second upstream device.

Through the signal order-preserving apparatus shown in FIG. 3, a preferred implementation manner of step 101 in the first embodiment of the present invention is as follows: when at least one first upstream device sends at least one request signal, each first upstream device corresponds to one valid signal, and each valid signal triggers a corresponding first selector to select data of a request signal of the first upstream device for a corresponding first FIFO memory. Meanwhile, the second upstream device sends no request signal, and therefore, each second upstream device corresponds to one invalid signal, and each invalid signal triggers a corresponding second selector to select invalid data for a corresponding second FIFO memory. Meanwhile, the valid signal and the invalid signal are input into the OR gate 31. After the OR gate 31 performs an OR operation, as long as at least one valid signal is included, the result of the OR operation is that the write control signal is valid. Therefore, the OR gate 31 sends a write-valid control signal to the at least one first FIFO memory and the at least one second FIFO memory, so as to write the data of the request signal of the first upstream device, where the data of the request signal is selected by the first selector, into the first FIFO memory, and write the invalid data selected by the second selector into the second FIFO memory.

The control module formed by the OR gate 31 and the selector 32 is used to control the write operation of the FIFO memory 33, so that all FIFO memories 33 between which there is the order-preserving requirement are filled with data in a same clock cycle. The invalid data is used to fill the FIFO memory 33 that receives no request signal, and the scheduling module 34 reads, from all FIFO memories 33, their respective data. Thereby, it is ensured that every request signal sent by the scheduling module 34 to the downstream device is a request signal in a same clock cycle, and that the request signals in contiguous clock cycles are not confused with each other. Therefore, a space location of the FIFO memory 33 that receives no request signal is occupied to ensure the time order of the request signals.

In the third embodiment of the present invention, order-preserving is performed by filling the invalid data into the FIFO memory that receives no request signal. A request signal sent by each upstream device is independent of each other, and a request signal sent by an upstream device does not need to be received according to a processing state of a request signal sent by another upstream device. Therefore, the coupling extent between the devices is reduced.

In the first to third embodiments of the present invention, data of all 0s or all 1s may be used as the invalid data. That is, all bits in the corresponding second FIFO memory are 0s, or all bits are 1s. In other specific embodiments, other preset data may be used as the invalid data according to actual situations so long as the invalid data is defined in advance by configuring the scheduling module.

On the basis of the foregoing technical solution, in step 102 in the first embodiment of the present invention, the conveying the data of the request signal to the downstream device may specifically be conveying the data of the request signal to the downstream device according to a preset priority policy. In the second embodiment or the third embodiment of the present invention, specifically, the priority policy may be preset in the scheduling module 24 or the scheduling module 34. When conveying the data of the request signal to the downstream device, the scheduling module 24 or the scheduling module 34 may convey the data of the request signal to the downstream device according to the preset priority policy. For example, the request signal may be a write request signal or read request signal. The preset priority policy may be a read-first policy, a write-first policy, a FIFO order policy, or a round robin scheduling policy. When the read-first policy is used, in a same clock cycle, data of a read request signal is sent first, and data of a write request signal is sent after the sending of the data of the read request signal in the same clock cycle is completed. When the write-first policy is used, in a same clock cycle, the data of the write request signal is sent first, and the data of the read request signal is sent after the sending of the data of the write request signal in the same clock cycle is completed. When a FIFO order policy is used, the priority is not distinguished for read and write operations, but the data of the request signals in the FIFO is sent in the FIFO order. When a round robin (RR) scheduling policy is used, the data of the request signals in the FIFO is sent in the preset round robin order. The round robin scheduling policy is also known as a cyclic scheduling policy, and the round robin order is also known as the cyclic order. In other specific embodiments, depending on actual situations, other priority policies may be used so long as the priority policies are preset in the scheduling module. Thereby, according to different priority policies, multiple request signals in a clock cycle are sorted according to the priority when the request signals in the same clock cycle are conveyed to the downstream device.

Figure 4:
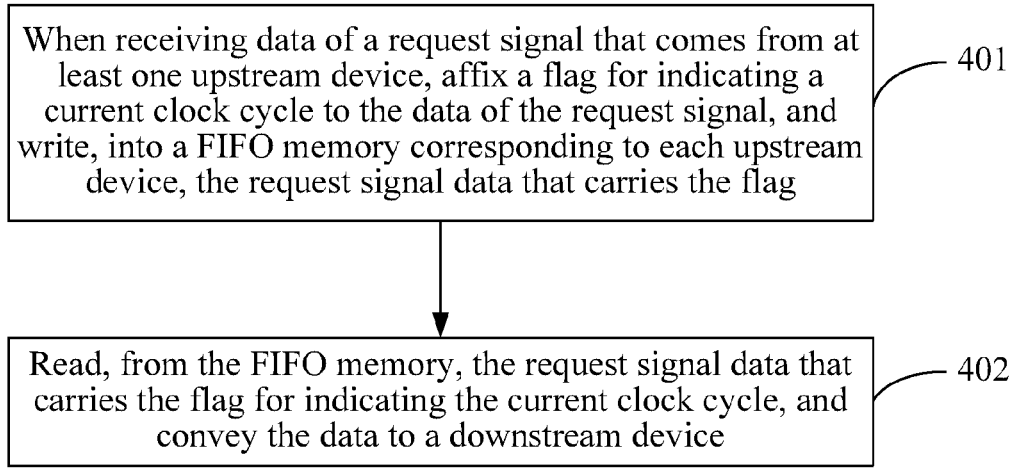
FIG. 4 is a flowchart of a signal order-preserving method according to a fourth embodiment of the present invention.

FIG. 4 is a flowchart of a signal order-preserving method according to a fourth embodiment of the present invention. As shown in FIG. 4, the method includes the following process.

Step 401: When receiving data of a request signal that comes from at least one upstream device, affix a flag for indicating a current clock cycle to the data of the request signal, and write, into a FIFO memory corresponding to each upstream device, the request signal data that carries the flag.

Step 402: Read, from the FIFO memory, the request signal data that carries the flag for indicating the current clock cycle, and convey the data to a downstream device.

In this step, the downstream device may be an ordinary memory. Specifically, when the data is read from the FIFO memory, all request signals with flags of one type are read at a time, and a different flag is used for each read operation. The flag used in each read operation is sorted in the order of clock cycles.

Through a combination of step 401 and step 402, when the data of the request signal is written into the FIFO memory, the data of the request signal is flagged according to a current clock cycle, and different flags are used in different clock cycles. When the data is read from the FIFO memory, data with a series of flags to be used for read operations is determined in the order of the clock cycles, and all request signals with flags of one type are read at a time. For example, an upstream device sends a request signal in a first clock cycle, and then, request signal data that carries a first clock cycle flag is written into a FIFO memory corresponding to the upstream device. Two other upstream devices send request signals in a second clock cycle, and then, the data of their respective corresponding request signals is written into FIFO memories corresponding to the two upstream devices, where the data carries second clock cycle flags. At the time of reading, the request signal data that carries the first clock cycle flag is read first, and sent to the downstream device, and then the request signal data that carries the second clock cycle flag is read, and sent to the downstream device. Thereby, the received request signals are flagged according to a current clock cycle, to ensure the time order of the request signals.

In the fourth embodiment of the present invention, order-preserving is performed by adding a flag. A request signal sent by each upstream device is independent of each other. A request signal sent by an upstream device does not need to be received according to a processing state of a request signal sent by another upstream device. Therefore, the coupling extent between the devices is reduced.

Figure 5:
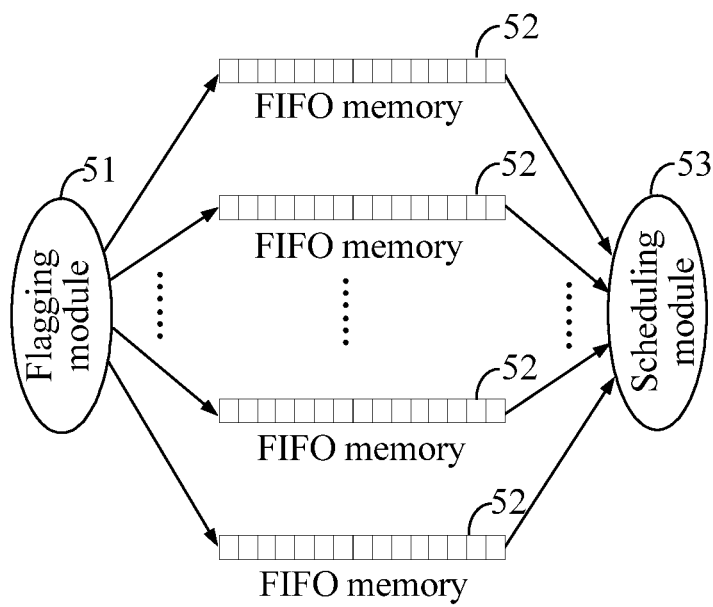
FIG. 5 is a schematic structural diagram of a signal order-preserving apparatus according to a fifth embodiment of the present invention.

FIG. 5 is a schematic structural diagram of a signal order-preserving apparatus according to a fifth embodiment of the present invention. As shown in FIG. 5, the signal order-preserving apparatus includes: a flagging module 51, at least one FIFO memory 52, and a scheduling module 53.

The flagging module 51 is configured to: when receiving data of a request signal that comes from at least one upstream device, affix a flag for indicating a current clock cycle to the data of the request signal, and exercise control of writing, into the at least one FIFO memory 52, the corresponding request signal data that carries the flag.

Each FIFO memory 52 corresponds to an upstream device and is configured to store the data of the request signal of the corresponding upstream device, where the data of the request signal carries the flag.

The scheduling module 53 is configured to read, from the FIFO memory 52, the request signal data that carries the flag, and convey the data to a downstream device. Specifically, when reading data from the FIFO memory 52, the scheduling module 53 reads all request signals with flags of one type at a time, and a different flag is used for each read operation of the scheduling module 53. The flag used by the scheduling module 53 for each read operation is sorted in the order of clock cycles.

Specifically, a counter for cyclic counting runs in the flagging module 51. When receiving a request signal, the flagging module 51 writes a current value of the counter together with the data of the request signal into the FIFO memory 52, and then the request signal data that carries the flag may be obtained at the egress of the FIFO memory 52. The scheduling module 53 may judge the order of the corresponding request signal according to a value of the flag.

When the data of the request signal is written into the FIFO memory 52, the flagging module 51 flags the data of the request signal according to a current clock cycle, and uses different flags in different clock cycles. When reading data from the FIFO memory, the scheduling module 53 determines, in the order of the clock cycles, data with a series of flags to be used for read operations, and reads all request signals with flags of one type at a time. For example, one upstream device sends a request signal in a first clock cycle, and then, the flagging module 51 affixes a first clock cycle flag to the request signal data to be written into a FIFO memory 52 corresponding to the upstream device; two other upstream devices send request signals in a second clock cycle, and then, the flagging module 51 affixes second clock cycle flags to request signal data to be written into respective FIFO memories 52 corresponding to the two upstream devices. When reading the FIFO memory 52, the scheduling module 53 reads the request signal data that carries the first clock cycle flag first, and sends the data to the downstream device; and then reads the request signal data that carries the second clock cycle flag, and sends the data to the downstream device. Thereby, the received request signals are flagged according to the current clock cycle, to ensure the time order of the request signals.

In the fifth embodiment of the present invention, a request signal sent by each upstream device is independent of each other. A request signal sent by an upstream device does not need to be received according to a processing state of a request signal sent by another upstream device. Therefore, the coupling extent between the devices is reduced.

In the first to fifth embodiments of the present invention, when the signal order-preserving method or apparatus in the foregoing embodiment is applied in a same clock domain, the input end and the output end of the FIFO memory in the method or apparatus correspond to the same clock domain, and therefore, the FIFO memory may be a synchronous FIFO memory, and may also be an asynchronous first input first output (AFIFO) memory; when the signal order-preserving method or apparatus in the foregoing embodiment is applied across clock domains, the input end and the output end of the FIFO memory in the method or apparatus correspond to different clock domains, and therefore, the FIFO memory is an AFIFO memory.

It should be noted that: for ease of description, each method embodiment mentioned above is expressed as a combination of a series of operations. Those skilled in the art should know that the present invention is not limited to the order of the described operations, and some steps may be performed in other order or be performed simultaneously according to the present invention. Meanwhile, those skilled in the art should know that the embodiments described in the specification are exemplary embodiments, and the involved operations and modules are not necessarily mandatory in the present invention.

In the foregoing embodiments, each embodiment emphasizes a specific aspect, and for the part not detailed in one embodiment, reference may be made to another embodiment.

Persons of ordinary skill in the art should understand that all or part of the steps for implementing the foregoing method embodiments may be performed by a program instructing relevant hardware. The program may be stored in a computer readable storage medium. When the program runs, the steps of the foregoing method embodiments are preformed. The storage medium may be any medium capable of storing program codes, such as read-only memory (ROM), random-access memory (RAM), magnetic disk or compact disc read-only memory (CD-ROM), register array, register stack, and so on, where the RAM includes the static random-access memory (SRAM) and the dynamic random-access memory (DRAM).

Finally, it should be noted that the foregoing embodiments are merely used for illustrating the technical solutions of the present invention, but not intended to limit them. Although the present invention is illustrated in detail with reference to the foregoing embodiments, persons of ordinary skill in the art should understand that: They may still make modifications to the technical solutions recorded in the foregoing embodiments, or make equivalent replacements to part of the technical characteristics; however, these modifications or equivalent replacements do not make the essence of the corresponding technical solutions depart from the spirit and scope of the technical solution in each embodiment of the present invention.

What is claimed is:

1. A signal order-preserving method, comprising:
when writing, into at least one first first input first output (FIFO) memory, data of a request signal that comes from at least one corresponding first upstream device, writing invalid data into at least one second FIFO memory corresponding to at least one second upstream device in a same clock cycle as that of writing the data of the request signal; and
reading the data of the request signal from the at least one first FIFO memory, reading the invalid data from the at least one second FIFO memory, discarding the invalid data, and conveying the data of the request signal to a downstream device,
wherein writing the invalid data into the at least one second FIFO memory corresponding to the at least one second upstream device in the same clock cycle as that of writing the data of the request signal, when writing, into the at least one first FIFO memory, the data of the request signal that comes from the at least one corresponding first upstream device, comprises:
sending, by the at least one first upstream device, at least one request signal;
triggering, by each valid signal of the first upstream device, a selector corresponding to one first FIFO memory to select data of one request signal for the corresponding first FIFO memory;
triggering, by each invalid signal of the second upstream device, a selector corresponding to one second FIFO memory to select the invalid data for the corresponding second FIFO memory; and
triggering, by the valid signal of the at least one first upstream device and the invalid signal of the at least one second upstream device, an OR gate to send a write-valid control signal to the at least one first FIFO memory and the at least one second FIFO memory.

2. The method according to claim 1, wherein the invalid data is data of all zeros or data of all ones.

3. The method according to claim 1, wherein conveying the data of the request signal to the downstream device comprises conveying the data of the request signal to the downstream device according to a preset priority policy.

4. The method according to claim 1, wherein the first FIFO memory is a first asynchronous first input first output (AFIFO) memory, and wherein the second FIFO memory is a second AFIFO memory.

5. A signal order-preserving apparatus, comprising:
a control module configured to exercise control of writing, into at least one first first input first output (FIFO) memory, data of a request signal that comes from at least one corresponding first upstream device, and exercise control of writing invalid data into at least one second FIFO memory in a same clock cycle as that of writing the data of the request signal;
the at least one first FIFO memory, wherein each first FIFO memory corresponds to a first upstream device and is configured to store, under control of the control module, the data of the request signal of the corresponding first upstream device;
the at least one second FIFO memory, wherein each second FIFO memory corresponds to a second upstream device and is configured to store the invalid data under control of the control module; and
a scheduling module configured to read the data of the request signal from the at least one first FIFO memory, read the invalid data from the at least one second FIFO memory, discard the invalid data, and convey the data of the request signal to a downstream device,
wherein the control module comprises:
at least one first selector, wherein each first selector corresponds to one first FIFO memory and one first up stream device, and is configured to select the data of the request signal for the corresponding first FIFO memory, as triggered by a valid signal of the corresponding first upstream device;
at least one second selector, wherein each second selector corresponds to one second FIFO memory, and is configured to select the invalid data for the corresponding second FIFO memory, as triggered by an invalid signal corresponding to the second upstream device; and
an OR gate configured to send a write-valid control signal to the at least one first FIFO memory and the at least one second FIFO memory, as triggered by the valid signal corresponding to the at least one first upstream device and by the invalid signal corresponding to the at least one second upstream device.

6. The apparatus according to claim 5, wherein the invalid data is data of all zeros or data of all ones.

7. The apparatus according to claim 5, wherein the scheduling module is configured to convey the data of the request signal to the downstream device according to a preset priority policy.

8. The apparatus according to claim 5, wherein the first FIFO memory is a first asynchronous first input first output (AFIFO) memory, and wherein the second FIFO memory is a second AFIFO memory.

* * * * *